UNITED STATES PATENT OFFICE 2,270,889

MANUFACTURE OF PENTAERYTHRITOL-POLYCARBOXYLIC ACID RESINS

Kurt Nagel, Frankfort-on-the-Main, and Franz Koenig, Walldorf, near Frankfort-on-the-Main, Germany, assignors, by mesne assignments, to Chemical Marketing Company Inc., New York, N. Y.

No Drawing. Application September 17, 1938, Serial No. 230,426. In Germany October 11, 1937

6 Claims. (Cl. 260—75)

The present invention relates to the manufacture of artificial resins by condensing pentaerythritol with organic acids.

The object of the invention is to improve the quality of the resins, of the method of production and of the quality of the pentaerythritol.

Another object of our invention is to provide a new material useful for electrical purposes especially for covering electric wires with an insulating layer of lacquer containing pentaerythritol resins.

Formerly the condensation of pentaerythritol with acids, such as phthalic or succinic acid was carried through till the removal of water vapour from the reaction mixture was finished. When afterwards trying to harden these masses, they become porous. Therefore these artificial masses could not be used for producing clear moulded bodies and so on.

According to the invention the mixture of pentaerythritol and the organic acids, especially polybasic acids, is subjected to a ripening process after condensation.

This ripening process consists of a continued heating at higher temperatures preferably in vacuo.

It is not yet quite clear which reactions cause this ripening, in many cases after some time of ripening the liberation of small quantities of water can be noticed. Thus the ripening can also be effected by heating at ordinary, elevated or reduced pressure, advantageously in the presence of hygroscopic substances, such as gypsum, sodium sulphate, and acetic anhydride. These masses, ripened according to the invention, can be hardened in any known manner, e. g. by raising the heating temperature or by continuing the time of heating. The hardening process is favoured by adding acidic substances, such as sulphuric, phosphoric, boric acid, sodium bisulphate, monochloracetic acid, benzol sulphonic acid. It is also possible to bleach the masses by adding bleaching substances, especially if the masses are not purified to any substantial extent.

Example 1

136 g. pentaerythritol are melted with 290 g. adipic acid and left at 140° C. half an hour. When after this time the liberation of water vapour is finished, the reaction mixture is ripened at 130° C. in vacuo for 1½ hours, whereafter the product is left at ordinary pressure at a moderate temperature i. e. in this case at 120° C. for ½ hour.

Instead of adipic acid also phthalic acid, succinic acid, oxalic, maleic, sebacic, tartaric, citric, aconitic acid and other or mixtures thereof can be used. Together with pentaerythritol other polyhydric alcohols such as glycerol, glycol, mannitol, can be reacted according to the invention. The reaction mixture may contain other substances able to condense or polymerize to form resins such as phenolic-formaldehyde, vinyl esters or other vinyl compounds such as acrylic derivatives, styrene etc. It has been found that polycarbonic acids with long chains such as adipic acid, pimelic acid, cause soft polymerization products to be obtained, which have qualities similar to those of caoutchouc or butadiene polymers. On the other hand, hard masses, which may be used as artificial glass, may be produced by reacting pentaerythritol with oxalic or phthalic acids. Generally the hardness of the product is varied by regulating the duration and the temperature of the ripening process. The resols, obtained according to the ripening process may be immediately subjected to a hardening process, e. g. by heating for 1–3 hours at temperatures of 160–180°. These hardened resols are well managed in stocking or shipping; later on they can be moulded by hardening in any desired manner.

Example 2

137 g. pentaerythritol and 332 g. phthalic acid or 296 g. phthalic anhydride are heated together for melting and are kept at 140–150° for 25 minutes. After the setting free of water vapour has ceased the reaction product is cooled to 120–130° and left at this temperature in vacuo for 20–40 minutes, eventually after gypsum has been incorporated. The mass obtained by this process may be treated as in the first example.

We have further found, that we may get excellent lacquer for covering and insulating electric wires of metal by condensing pentaerythritol with aliphatic saturated carbonic acids which contain more than 5 carbon atoms in the molecule. We can use mono- as well as poly-basic acids for this purpose, e. g. caprylic acid, sebacic acid, adipic acid, stearic acid, lauric acid. We prefer to use those monobasic acids which contain 8–12 carbon atoms, especially the mixture of fatty acids taken from the oxidation of paraffin.

The lacquer made from these condensation products possess excellent adhesive qualities to the metal wires, the wires may be bent, without destroying the covering resin layer. The lacquer-films do not get brittle with time, in contrast to the lacquer made with the aid of softening agents. It is a special advantage of these products that they can be used as metal wire lacquers without any addition of a softening agent being necessary.

It is preferable to cover the metal wires with the lacquer by dissolving the condensation products or by using them in the molten state. In the latter method it is necessary that the condensation product is partially or wholly in the so-called A-stage, that is the first stage immediately after the condensation when no-hardening or no insolubility has been initiated. The covered wire is put into an ovenroom having a temperature of 180–250°, whereby the lacquer becomes infusible or at least difficultly fusible. Of course, it is desirable, but not necessary, to ripen the resins before applying them to the wire in the manner described above. The coverings may contain in addition other artificial resins highly valuable for insulation in electrical work, such as polystyrene as well as phenol-formaldehyde resin, urea-resins, vinyl resins, chlorinated caoutchouc, which may be added to the molten lacquer or the solution of the resins. It is also possible to add hardening oils.

*Example 3*

136 g. pentaerythritol are melted with 292 g. adipic acid at 160° and thereafter ripened at 130°. A wire with a diameter of 0.03–3 mm. is drawn through this melt at 110° in such a way, that it is homogeneously covered with the lacquer while an eventual excess is removed by an apparatus for stripping it off. The wire is led through an oven having a temperature less than 400°. The lacquering and the enameling can be repeated several times. After being cooled the layer is completely soft and dense; it is fast against high voltage and free from pores as examination shows.

The condensation product for the lacquer can also be dissolved in a solvent as ethanol and be applied in the form of such a solution. The solvent is such as to give a homogeneous cover after evaporation. It is therefore preferable to add higher boiling alcohols to the solvent.

A special advantage of the lacquer is that it does not flow away when heated to higher temperatures and that its chemical and physical qualities remain unchanged for years.

A further part of the invention relates to the production of a pentaerythritol of high melting point, which is well suited for use in the production of the resins or explosives.

It is an object of my invention to produce a pentaerythritol with melting point up to 257° C. and even more.

Our invention consists in concentrating and making solutions of pentaerythritol crystallize in the presence of free acids in the limits of 1–10%, preferably 2–6%, related to the quantity of the concentrated solution. As free acids we use sulphuric, phosphoric, benzene sulphonic, acetic acids and the like.

The process according to the invention is very useful in the production of pentaerythritol from the components acetalehyde and formaldehyde. In this process formaldehyde and acetaldehyde are reacted together in an aqueous medium in the presence of alkaline substances such as calcium hydroxide. The aqueous reaction solution contains pentaerythritol di-pentaerythritol ether and other products. In order to separate the pentaerythritol, the alkaline condensing agent is neutralized, and the solution is concentrated so that crystallization occurs. According to the invention we take care that this crystallization takes place in the presence of sufficient quantities of free acid. We prefer the free acid to be present already during concentrating the solution by evaporation. We suppose that under these circumstances chemical reactions take place which are important for obtaining very pure pentaerythritols but which take a certain time for development. As we mentioned above it is necessary that the quantities of free acid which must be present are between 1–10% of the volume of the concentrated solution. We prefer to use strong acids, mineral acids, benzene sulphonic acid, in the case of isolating the purest pentaerythritol immediately from the reaction mixture. The yields in solid matter appear to be smaller then by the known methods, and we suppose that the older process yielded only such pentaerythritols as were combined with large quantities of impurities. If one tries to purify the former impure products by repeated crystallization the yields decrease below the limit of the yields obtainable by our invention. Besides that in the former methods one never does obtain such pure products as we produce according to our invention.

*Example 4*

A stirring apparatus which is provided with a cooling coil, was filled with 1200 liters of water, 40 kg. (30% of weight) formaldehyde, that is the solution of formaldehyde of 7,5%. Over a period of 6 hours 44 kg. acetaldehyde (in a 25% solution) were added, and 42 kg. finely powdered calcium hydroxide portion by portion at half hour intervals. The temperature was kept at 15–16° C.

After the condensation process was finished sulphuric acid was added to the reaction mixture while stirring in such quantities as to change all calcium hydroxide to calcium sulphate and, besides that, to have still 2.6–2.8% of free acid, related to the below mentioned final volume, in the reaction solution. After separating the precipitated calcium sulphate the clear solution was concentrated at 90° C. up to $\frac{1}{10}$ of the initial volume. The remaining volume determines the percentage of the free acid present according to the invention. The concentrated solutions are caused to crystallize, and the crystals are centrifuged and washed with little water. The crude product is purified by one single recrystallization in water. I obtain a pentaerythritol with a melting point of 255° C. and a yield of 45%. Of course it is also possible to purify crude pentaerythritol according to our process. For this purpose we dissolve the crude product in water, add a sufficient quantity of sulphuric acid, heat the solution for some time, concentrate and make it crystallize. Even a solid crude pentaerythritol is subjected to a treatment with free acids in order to purify it. In this case we prefer to use relatively weak acids such as acetic acid. Generally we provide the steps of our invention in the production of pentaerythritol itself as we have shown above.

What we claim is:

1. In the process for preparing artificial resinous products from poly-carboxylic acids and polyhydric alcohols which involves melting about 136 parts of pentaerythritol and about 290 parts of adipic acid to form a reaction mixture, holding said reaction mixture at about 140° C. for about 0.5 hour until the evolution of water vapor is practically finished, whereby a first stage condensation product is obtained, the improvement which comprises heating said first stage condensation product at about 130° C. in a vacuum for about 1½ hours to obtain a tempered heat treated condensation product, and then subjecting said tempered heat treated condensation product to a temperature of about 120° C. for about 0.5 hour at atmospheric pressure to obtain a hardened ripened condensation product.

2. In the process for preparing artificial resinous products from poly-carboxylic acids and polyhydric alcohols which involves melting about 137 parts of pentaerythritol and about 332 parts of phthalic acid to form a reaction mixture, and holding said reaction mixture at a temperature of about 140° C. to about 150° C. for about 25 minutes to obtain a first stage condensation product, the improvement which comprises heat treating said first stage condensation product at about 120 to about 130° C. in a vacuum for about 20 to about 40 minutes after gypsum has been incorporated to obtain a heat treated first stage condensation product and then subjecting said heat treated first stage condensation product to temperatures of about 120° C. at atmospheric pressure for about 0.5 hour to obtain a heat treated, tempered and hardened condensation product.

3. As a new article of manufacture, hardened tempered artificial resinous products being substantially devoid of pores and cavities, comprising a hardened artificial resinous product containing the condensation product of poly-carboxylic acid and pentaerythritol, said condensation product having been made in accordance with the process set forth in claim 1.

4. As a new article of manufacture, hardened tempered artificial resinous products being substantially devoid of pores and cavities, comprising a hardened artificial resinous product containing the condensation product of poly-carboxylic acid and pentaerythritol, said condensation product having been made in accordance with the process set forth in claim 2.

5. In the process for preparing artificial resinous products from polycarboxylic acids and polyhydric alcohols which involves melting a reaction mixture containing polycarboxylic acid and pentaerythritol, holding said reaction mixture at about 140° C. for about 0.5 hour until the evolution of water vapor is practically finished, whereby a first stage condensation product is obtained, the improvement which comprises heating said first stage condensation product at about 130° C. in a vacuum for about 1½ hours to obtain a tempered, heat treated condensation product, and then subjecting said tempered, heat treated condensation product to a temperature of about 160° C. to about 180° C. for about 1 to about 3 hours at atmospheric pressure to obtain a hardened, ripened condensation product.

6. As a new article of manufacture, hardened tempered artificial resinous products being substantially devoid of pores and cavities, comprising a hardened artificial resinous product containing the condensation product of poly-carboxylic acid and pentaerythritol, said condensation product having been made in accordance with the process set forth in claim 5.

KURT NAGEL.
FRANZ KOENIG.